(12) United States Patent
Reep

(10) Patent No.: US 6,360,179 B1
(45) Date of Patent: Mar. 19, 2002

(54) SYSTEMS, METHODS AND APPARATUS FOR WIRELESS TRANSMISSION AND RECEPTION OF DATA BY AGRICULTURAL FIELD SENSORS

(75) Inventor: Paul J. Reep, Idaho Falls, ID (US)

(73) Assignee: Milestone Technology, Inc., Blackfoot, ID (US)

( * ) Notice: Subject to any disclaimer, the term of this patent is extended or adjusted under 35 U.S.C. 154(b) by 0 days.

(21) Appl. No.: 09/507,142

(22) Filed: Feb. 18, 2000

(51) Int. Cl.[7] .............................................. G01D 18/00
(52) U.S. Cl. ...................................... 702/104; 702/188
(58) Field of Search ........................... 702/85, 90, 104, 702/187, 188; 324/110

(56) References Cited

U.S. PATENT DOCUMENTS

| | | | | |
|---|---|---|---|---|
| 5,153,837 A | * | 10/1992 | Shaffer et al. | 702/412 |
| 5,337,260 A | * | 8/1994 | Spangler | 702/88 |
| 5,377,128 A | * | 12/1994 | McBean | 702/91 |
| 5,839,094 A | * | 11/1998 | French | 702/91 |
| 5,892,690 A | * | 4/1999 | Boatman et al. | 700/276 |
| 6,041,007 A | * | 3/2000 | Roeckner | 365/225.7 |

* cited by examiner

Primary Examiner—Marc S. Hoff
Assistant Examiner—Craig Steven Miller
(74) Attorney, Agent, or Firm—Kirton & McConkie; Michael F. Krieger

(57) ABSTRACT

The present invention relates to communication with remote crop characteristic sensors and verification of data transmitted therefrom. Embodiments of the present invention comprise systems, methods and apparatus for transmitting calibration data directly to a remote crop characteristic sensor and calibrating the remote sensor such that its measurements reflect accurate crop characteristics. Also comprised in embodiments of the present invention are systems, methods and apparatus for verifying remote crop sensor output. Some of these methods comprise transmitting from remote sensors crop characteristic data combined with calibration data identification so that a party can verify that the correct calibration data was used by the sensor while making the crop characteristic measurements.

9 Claims, 5 Drawing Sheets

SYSTEMS, METHODS AND APPARATUS FOR WIRELESS TRANSMISSION AND RECEPTION OF DATA BY AGRICULTURAL FIELD SENSORS

FIELD OF THE INVENTION

The present invention relates generally to communication with and calibration of precision agricultural sensors used on agricultural field equipment. More specifically, the present invention relates to methods and apparatus for transmitting calibration data from a testing laboratory to sensors on agricultural field equipment, such as harvesting equipment, so that the sensors may more accurately determine agricultural properties and sensor performance can be verified. Some systems of the present invention allow a broker or other parties to obtain calibration data from an independent laboratory and provide that data to farmers who will be selling crops through that broker or other parties thereby allowing the broker or other parties to maintain quality control and identity preservation of agricultural products.

BACKGROUND

Traditionally, farmers have harvested their crops and transported the harvest to a storage facility from which a broker transacts a sale of the crops. Generally, the crop is analyzed at the storage facility to determine its quality or other characteristics. Some buyers may specify requirements, such as discrete chemical constituents or components, for the crops they buy and may pay a premium price for crops with certain characteristics.

A farmer who does not independently analyze his crop is unable to negotiate a premium price from a buyer as the characteristics of his crop are unknown. Therefore, many farmers now perform independent analyses of their crops to ascertain the characteristics thereof. This independent analysis allows a farmer to bargain for a premium price on a crop of unusual quality or to meet the requirements of a specific buyer.

When crop quality is substantially uniform throughout a given plot, a farmer may simply analyze a few random specimens to determine a representative quality for the crop as a whole, however this situation is rare and errors are usually introduced through the use of this simple method. When crop characteristics may vary or a more accurate representation is desired, a farmer may analyze a quantity of samples taken at regular intervals throughout the harvested crop. Various known methods exist for analyzing representative samples taken at various intervals. Other methods use tagging devices during harvesting to mark samples and correlate the samples with their location in the field.

Even more accurate methods exist which may perform a substantially continuous analysis of the crop as it is being harvested. Some of these sensors are capable of measuring crop characteristics at two second intervals. These substantially continuous analysis methods typically utilize on-board devices on the harvesting equipment to determine crop characteristics. These methods may also be coordinated with location information so that crop characteristics may be correlated with crop location. These methods often use an optical or spectral analysis technique to determine crop characteristics. Other techniques may also be used.

This type of real-time crop analysis allows a farmer to determine crop quality and other characteristics while in the field and to negotiate with a buyer for a premium price when crop characteristics allow. Real-time crop analysis also allows a farmer to determine the location to which a crop will be sent as the crop is being harvested thereby eliminating the need for storage or the need for a broker. Many transportation costs and storage costs may be eliminated and profits lost to middlemen may be recovered or redistributed.

Many of the sensors used for real-time and other crop analysis methods employ infrared, near-infrared (NIR) or other optical or spectrometric methods to determine crop characteristics. These devices range from hand-held, portable devices to devices mounted in harvesting or storage equipment. For real-time analysis methods, the sensor is typically installed on the harvesting machine at a location where it can analyze the harvested crop as it passes to an on-board storage container.

These optical and spectroscopic sensors are extremely sensitive and can very accurately determine crop characteristics, however, they must be properly calibrated to achieve this accuracy. Calibration is typically performed annually. A plurality of samples are evaluated in a laboratory and sensor calibration parameters are produced. These parameters are then embodied in software or hardware such as ROM or other devices and manually transported to each sensor for updating of the calibration parameters on each device.

Calibration can be a time consuming process as new parameters are disseminated to myriad farmers in remote areas. It can also be a confusing or deceptive process if calibration parameters are not standardized, at least for a specific region, crop variety or regional crop variety. When calibration parameters are not universally applied, sensor output will vary from sensor to sensor and farmer to farmer making sensor data unreliable and potentially deceptive.

SUMMARY AND OBJECTS OF THE INVENTION

The present invention relates to systems, methods and apparatus for calibrating a plurality of agricultural sensors so that sensor output can be verified and standardized. These methods generally comprise a laboratory which can analyze crops and generate sensor calibration data so that sensors will accurately reflect the true characteristics of a crop. Chemometric methods are typically applied to generate calibration data. Generally, a large number of samples with varying characteristics will produce a more robust chemometric model that will be more accurate over a wider variation in crop characteristics. Therefore, collection of a large number of varied samples from areas with differing environmental factors is preferred. Typically, these samples will be crop specific and calibration data will need to be generated for each type and variety of crop.

Farmers participating in a given calibration data program may be required to provide a number of samples from their crops. Once these are collected for a number of farmers the samples may be analyzed and chemometric or other methods may be applied to generate sensor calibration data.

This calibration data must then be transferred to each sensor to ensure accurate sensor readings. Known methods for transferring calibration data have required the replacement of hardware cards containing memory and logic devices which carry the complex calibration data. These methods were time-consuming and expensive and often required the work of a skilled field technician to install the cards or chips. The time, materials and cost involved in recalibration often precludes recalibrating at prudent intervals making sensor measurement less accurate and reliable. These known methods also involve opening the sensor apparatus and exposing the sensitive electronics to a dirty and hostile environment thereby risking damage and undue wear. This exposure can actually reduce reliability as electronic components become exposed to dirt and moisture and become more likely to fail prematurely.

The methods and apparatus of the present invention may utilize a wireless link between a calibration data provider and the actual sensor machinery. The calibration data provider may be an independent service provider, a broker or other entity who arranges for sample analysis and calibration data generation. This provider may then broadcast the calibration data using wireless communications methods thereby eliminating the logistical problems associated with distribution of modified calibration hardware. Encryption and security protocols may be used to ensure privacy.

Typically, in the systems of the present invention, a farmer will have a wireless communications device in connection with sensors on the harvesting machinery. This communications device will receive the calibration data and use that data to configure the sensors connected thereto. Once this calibration configuration takes place, the sensors may be used until the calibration data is updated. Calibration updates may take place annually or over some other interval.

As more samples are analyzed in the laboratory, the chemometric model or other parameters may change. When these changes become significant, an update may be issued and farmers will be notified of the change so that they may recalibrate their sensors. Alternatively, the methods of the present invention may automatically update calibration data as needed by sending a signal to a communications and computing device connected to each sensor which in turn updates calibration data for the sensors.

Once calibrated, the harvesting or other sensor-equipped machinery may operate with accuracy and reliability. For sensors and equipment used for real-time evaluation of crops as they are harvested, crop characteristics may be communicated back to an electronic market, broker or others as the crop is being harvested. In this manner, the farmer may take full advantage of the real-time evaluation by selling and directly transporting his crop to buyers thereby eliminating middlemen and storage costs. However, despite the technological advantages of some systems of the present invention, some buyers may be wary of the reliability of the data provided from the farmer.

A prudent buyer must be assured that the information received from the farmer is accurate, correct and reliable. Sensor calibration data may be modified by an unscrupulous user to inaccurately reflect a higher crop quality or more desirable crop characteristic. A user may also unwittingly have received corrupted data for calibration. Whatever the reason, the calibration data used in the sensor may be verified by transmitting the calibration data, or representation of the calibration data, to the buyer from the sensor device used to supply the accompanying crop characteristic data. A buyer or other party may also receive calibration data or a representation thereof directly from the calibration data provider. When both data representations have been received, a party may compare the two to verify that the sensor was transmitting accurate and reliable data. In this manner, a buyer or other party may be sure that the quality or characteristic represented in the crop data accurately represents the actual crop being purchased.

An independent party may also operate a verification service which compares and authenticates crop characteristic data. Likewise, a calibration service provider or other organization may provide crop data authentication services to enhance market security and confidence.

To accomplish these verification and authentication methods, crop characteristic data must be related to the sensor calibration data. This may be accomplished in many ways. In some embodiments, it may be accomplished by having the sensor and associated communications and computing devices transmit crop characteristic data that is tagged with or otherwise related to the sensor calibration data in use at the time the crop characteristic data was measured. These related data transmissions can be verified at the receiving parties' computer by comparison with calibration data which is independently sent to the receiving parties. Calibration data may also be related to crop characteristic data by time stamping the calibration data and transmitting the time stamped calibration data at regular intervals so that third parties may verify that the correct calibration data is being used during the period in which they are monitoring crop characteristics.

Another method used in embodiments of the present invention uses location data obtained from GPS or other location sensors to correlate the location of the sensor with regionally limited calibration data. A particular sensor will be calibrated for use with a specific crop variety which is typically grown in a particular region. If location data indicates that the sensor is being used outside a region where that crop is grown, the crop characteristic data may be tagged as inaccurate or the recipient of the data may be alerted to the dubious nature of the data.

Another embodiment of these data verification methods comprises a sensor unit with controlled calibration parameter access. Access to and manipulation of the calibration data is controlled by password access or other security precautions such that the calibration data cannot be manipulated without the proper password or other security measure. In this way, the calibration data may be uploaded to the sensor unit from a verification service with controlled access to the unit. Other parties will not have access to the data so tampering will be eliminated and the calibration data will remain undisturbed during the harvest season. When needed, new calibration data may be transmitted to the sensor unit from the verification service or some other party with exclusive access. The verification service or other designated party may update the calibration data periodically during the harvest season or access the calibration data to verify that tampering has not occurred.

Accordingly, it is an object of some embodiments of the present invention to disseminate sensor calibration data in an efficient and coordinated manner.

It is another object of some embodiments of the present invention to improve the reliability of real-time sensor data.

It is still another object of some embodiments of the present invention to improve the accuracy of real-time sensor data.

It is yet another object of some embodiments of the present invention to provide apparatus, systems and methods for verifying crop characteristics and associated data.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

The present invention relates generally to methods, systems and apparatus for disseminating sensor calibration data, calibrating crop characteristic sensors and verifying crop sensor data integrity. These methods, systems and apparatus may be used to provide more accurate and reliable crop information at the time of harvest and may be used to more efficiently and profitably market crops.

Figure 1:
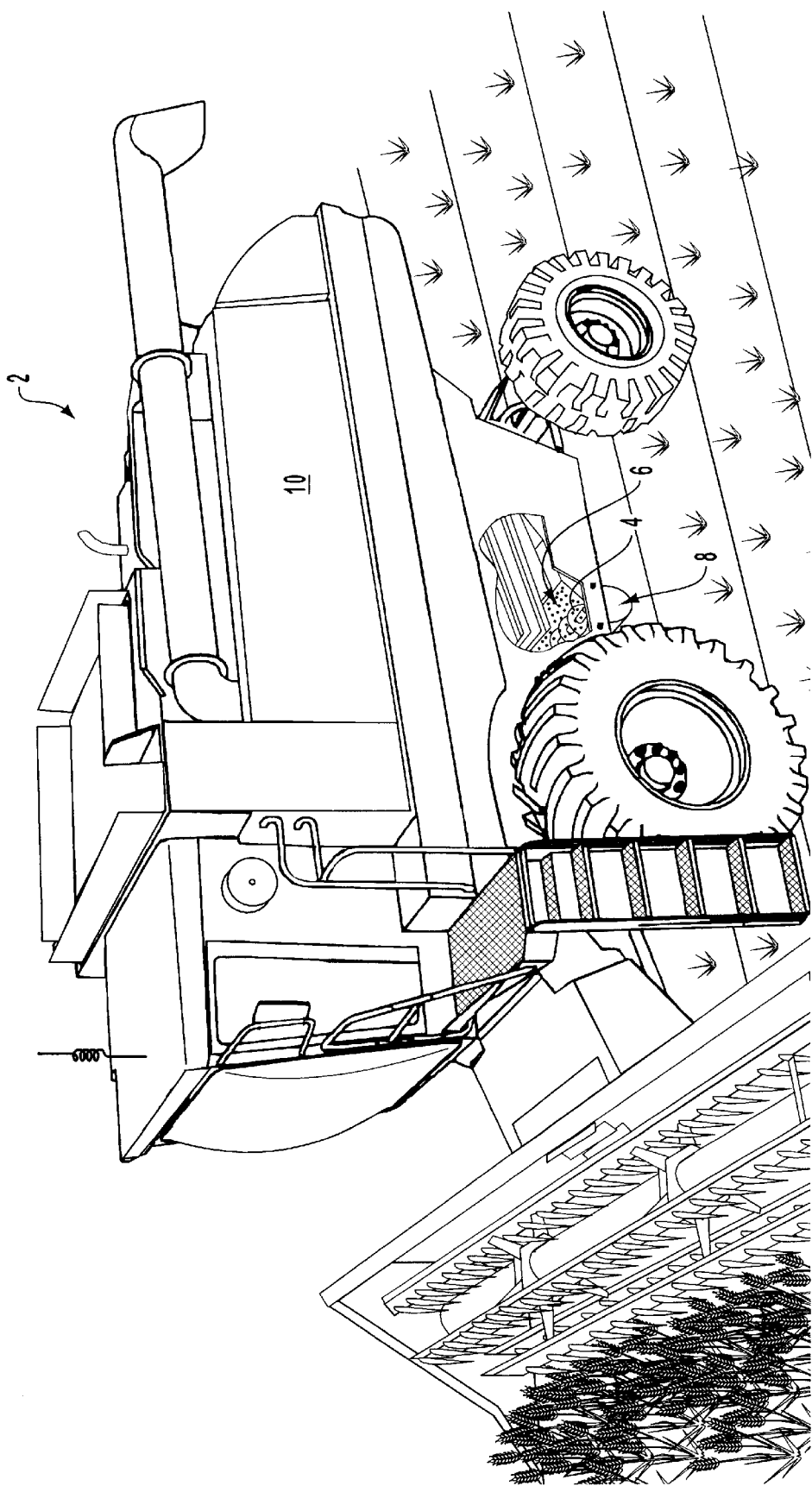
FIG. 1 is a perspective view of an exemplary harvesting machine with a partial cut-away section depicting a preferable sensor location for evaluating properties of a crop in accordance with the present invention during.
Figure 2:
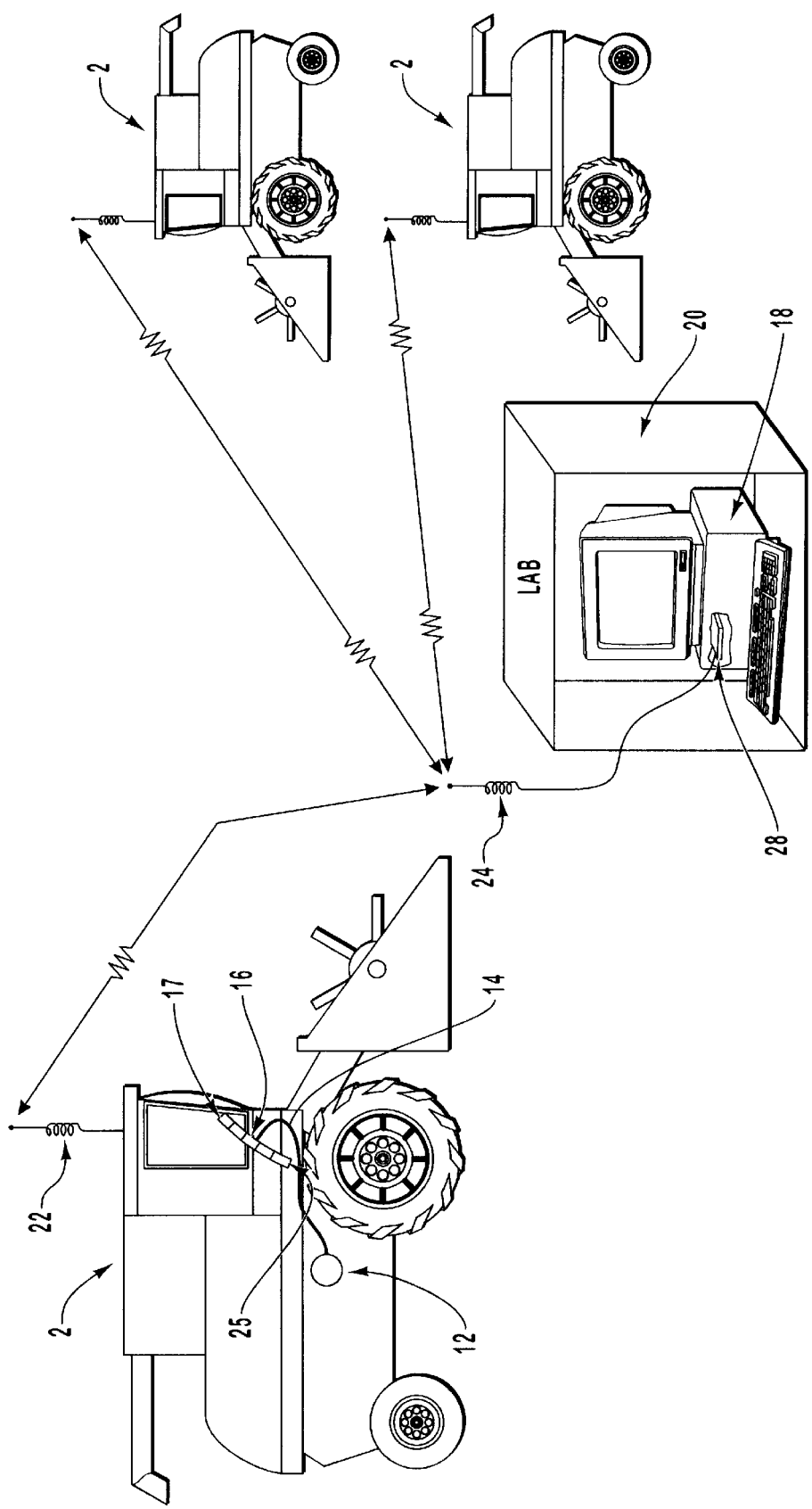
FIG. 2 is an diagram showing the link between harvesting machines and a calibration data lab.

Many of the sensors used for real-time as well as other crop analysis methods employ infrared, near-infrared (NIR), ultrasonic, tomographic, magnetic resonance, other optical or spectrometric methods or other methods to determine crop characteristics. For the real-time analysis methods of embodiments of the present invention, sensors may be installed on a harvesting machine, such as a combine 2, at a location where it can analyze the harvested crop as it passes to an on-board storage container, as shown in FIG. 1. Typically, combines will have an auger 4 or similar device for transporting grain or similar crops 6 through a conduit 8 to an on-board storage container 10. A preferable location for a crop characteristic sensor will be along this conduit 8 where a majority of the crop will pass, however, other locations will also work well depending on the type of sensor being used and the crop and harvesting machine used. New sensors are capable of observing a dynamic sample presentation, such as a flowing stream of grain or other crop. These sensors are preferably located where harvested crops will flow past the sensor thereby presenting a broader crop sample from which more accurate measurements may be taken.

The sensors used in embodiments of the present invention can be extremely sensitive and can very accurately determine crop characteristics when properly calibrated. A preferred sensor for some embodiments of the present invention used for harvesting grain and similar crops employs near-infrared (NIR) technology to determine crop characteristics. NIR sensors utilize a predictive method having a model developed against a reference standard. The reference standard may be a total nitrogen/combustion standard or one of many other standards. These standards are implemented into predictive models, often using chemometric methods involving partial least squares (PLS) analysis. As a non-limiting example, near-infrared transmittance (NIT) may be used in conjunction with Kjelldahl methods using a wet chemistry, mercury reduction technique to develop a chemometric predictive model.

Once a model is established it may be remotely downloaded to sensors where it will be used to determine crop characteristics. Model parameters may be adjusted periodically to update or otherwise modify the model. In some instances, the model may be hard-wired into the sensor hardware leaving only select parameter variables for adjustment of the model. In other embodiments, the entire model may be changed as needed. In this document, the term "parameter" may refer to one or more models, the variable parameters related to those models or any combination of these elements.

Chemometric or other predictive models used in the sensors of embodiments of the present invention or their parameters may be changed periodically to improve their accuracy, precision, reliability or other features. Models are often manipulated or changed each year as data from new crop samples appears. Models or their parameters may need modification due to changing environmental conditions, new varieties of crops with differing spectral qualities, changes in chemical, nutrient, or water management, changes in rainfall and moisture and spatial and temporal variability considerations. As new data accumulates, predictive models may develop which will account for many of these factors. Currently, however, models are typically updated at least each year for optimal accuracy. The wireless calibration methods of the present invention will enable the development of more rigorous and accurate predictive models for NIR and other sensors as calibration and related data is more freely transmitted between sensors and laboratories. Currently, model development has been constrained by insufficient data space and access as previous models were acquired and developed using traditional hand sampling and transport.

Generally, sensor calibration parameters are generated by evaluating a plurality of samples in a laboratory. Samples which represent a broad cross-section of the crop to be evaluated will produce more accurate models. The methods and systems of the present invention may comprise sample collection methods and processes which take samples from each area in which sensors may be used so that each variation of crop is represented in the model.

Once a model and/or its parameters have been calculated for calibration of crop sensors, the calibration data must be disseminated to each crop sensor to ensure that the sensors are accurately measuring crop characteristics. This may be performed through distribution of hardware cards or chips containing ROM or other memory or logic formats as well as other computer-readable media. However, a preferred embodiment of the present invention utilizes a wireless transmission of the calibration data directly to the equipment on which the sensors are mounted.

This preferred embodiment preferably comprises a calibration lab 20 or other calibration data source with a centralized computing device 18 in connection with a wireless communications device 28, such as a cell modem or other communications device capable of data transmission and, in some embodiments, data reception. Remote sensors 12 on harvesting equipment 2 also comprise a remote computing device 16 in connection with a remote wireless communications device 17. The centralized computing device 18 at lab 20 may transmit the calibration data to each of the remote sensors 12 via the wireless communications devices 17, 28 connected to the centralized computing device 18 and the remote sensors 12. The remote computing devices 16 attached to the remote sensors 12 may then configure the sensors 12 using the new calibration data so that sensor 12 measurements will be accurate and reliable. Remote computing device 16, remote communications device 17 and sensor 12 may all be comprised within an integral unit or may exist as separate units connected by a communications link. Actual conversion of calibration parameters to machine readable code may take place at sensor 12 with its remote computing device 16 and/or at centralized computing device 18 or some intermediate processor in the system (not shown).

It is to be understood that remote communications devices 17 and communications device 28 may communicate bilaterally by sending data in either direction. In this manner, communications device 28 may verify calibration data in use at remote communications device 17 and may receive data from sensor 12 and remote computing device 17 relating to crop characteristics measured by sensor 12, calibration data used by sensor 12, the location of harvester 2 and other data pertinent to sensor use and calibration and communication therewith. Bilateral or unilateral communication between sensors 12 and their related remote computing 16 and communications 17 devices and other communications and computing devices may take place automatically without any operator involvement. Embodiments of the present invention may be programmed to update calibration data automatically at specified time intervals, dependent upon sensor location or in relation to other parameters.

These calibration data dissemination methods of the present invention represent a significant advance in the art due to the logistical advantages of wireless calibration and the elimination of hardware manipulation which exposes the sensitive electronic environment of the sensors and related computing devices to dirt and moisture. The wireless transmission of calibration data also allows equipment calibration while the equipment is being transported or serviced. In this manner, equipment capable of wireless calibration may be used for one variety of crop and then recalibrated for use with another variety or type of crop as it is transported to a new location.

Location data, such as that obtained from a GPS unit attached to a piece of equipment may also be used in conjunction with calibration methods. An embodiment of the present invention periodically sends location data from harvesting machine 2 to calibration lab 20 thereby disclosing its location. The calibration lab then checks the location data against a lookup table which indicates the type of crop grown at that location. The lookup table may be updated seasonally to accurately reflect the crops grown in each area. If the calibration data in use in machine 2 is correct for that particular location, the sensors are not calibrated. If the calibration data is not appropriate for the crop at the indicated location, sensors 12 are recalibrated for the crop grown in the area. Alternatively, an alert may be transmitted to communications device 17 and/or other parties that the calibration data is not valid.

In another embodiment of the present invention, calibration data may be updated according to time related data. The remote communications device 17 may also transmit time data to a centralized computing device 18 where crop harvesting time constraints are stored in a computer readable storage device. Computing device 18 may check the time data and calibration data against the harvesting time constraints to determine whether the calibration data being used is typically used for a crop harvested during the time indicated by the time data. If the calibration data is incorrect for crops harvested during that time, an alert may be transmitted to the remote computing device or to another party, via any communication medium, to indicate that the calibration may be incorrect and that the associated crop characteristic data may be inaccurate.

As some embodiments of the present invention will be utilized in systems which communicate crop characteristics to a market to negotiate a sale of the crop, it is conceivable that some users may attempt to change sensor configuration parameters to reflect an inaccurately high crop quality in order to negotiate a higher sale price for a crop. Therefore, some of the systems, methods and apparatus of the present invention comprise means for assuring market participants that sensor data is accurate and reliable. This may be achieved in several ways.

In some preferred embodiments of the present invention, the remote sensors 12 and their associated computing devices 16 and communications devices 17 will be arranged so that sensor configuration data may not be changed in the field. Configuration parameters may only be changed from the centralized computing device 18 making sensors 12 tamper-proof. In this manner, sensors 12 may be configured from the centralized computing device 18 with valid configuration data and system users can be assured that the valid data cannot be changed by those who would take unfair advantage of the system. This system may be referred to as a tamper-proof sensor package. Some embodiments of the tamper-proof sensor package may be physically inaccessible due to permanent seals or alarms which indicate when physical access has been achieved. A message may be sent by remote communications device 17 to indicate that tampering has occurred, or a switch or other indicator may be set within sensor 12 or its associated computing 16 or communications device 17 to indicate, during subsequent use, that tampering has occurred. While the tamper-proof sensor package may be adequate for thwarting would-be system abusers, some participants may desire further verification of sensor data.

A further embodiment of the present invention utilizes a crop characteristic verification method which relates crop characteristic data with the sensor calibration data used at the time the crop characteristic data was measured. Using these methods, a market participant or other interested party may verify that crop characteristic data is accurate by checking that the sensor calibration data used to measure the crop data was the correct calibration data for its use.

Figure 3:
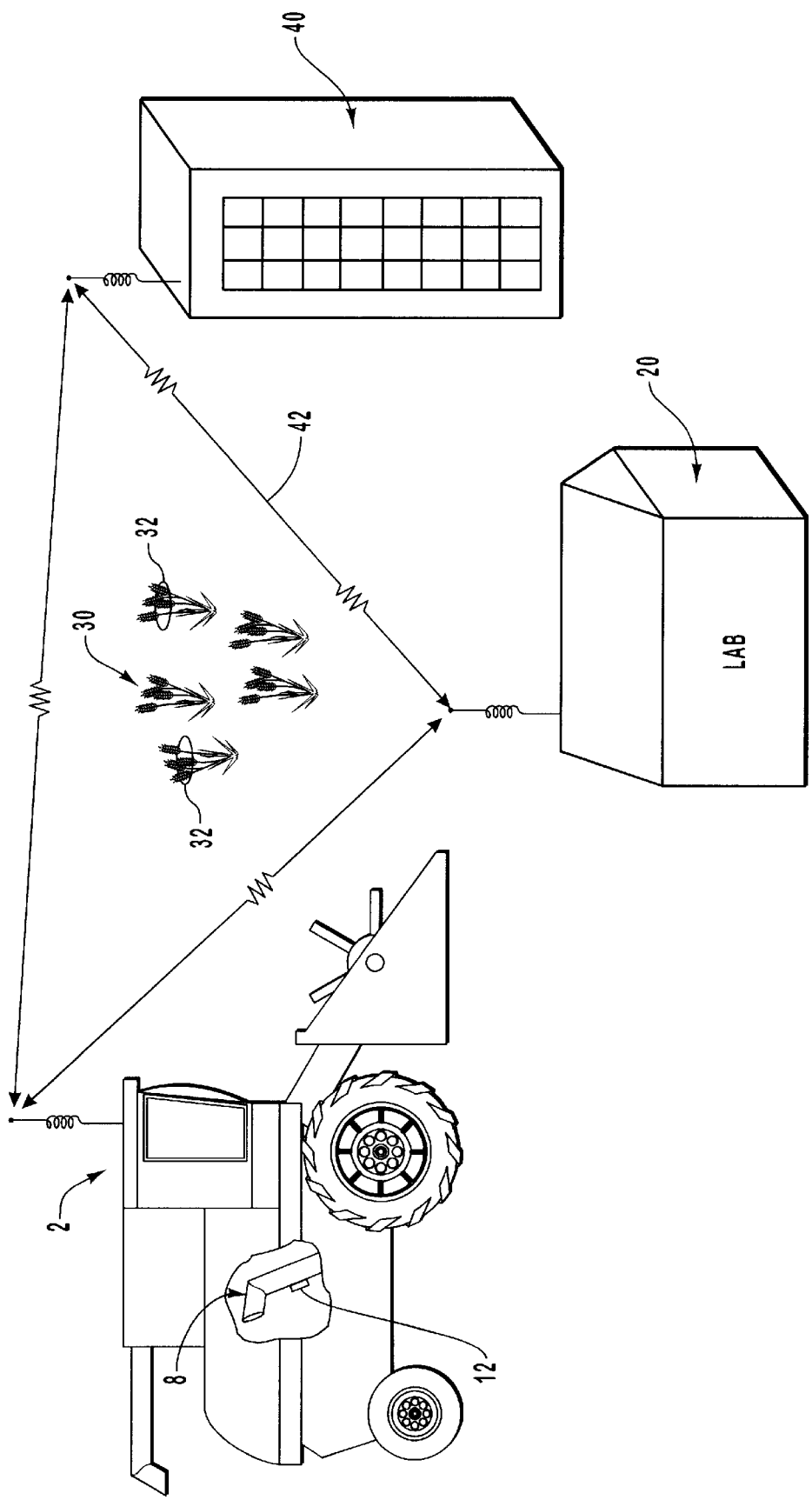
FIG. 3 is a diagram of elements of a preferred embodiment of the present invention showing transmission of verified crop characteristic data to a broker.
Figure 4:
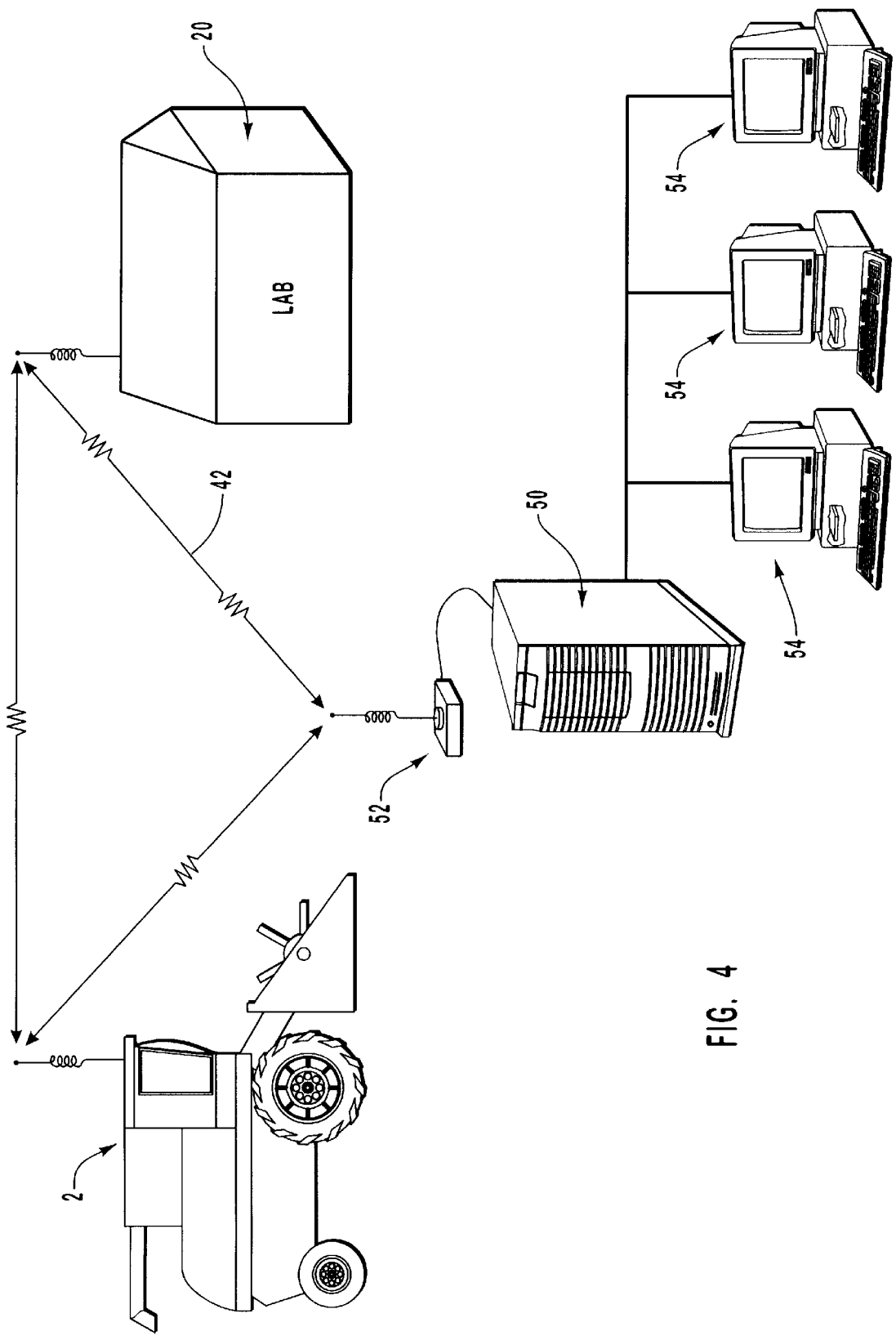
FIG. 4 is a diagram of elements of a preferred embodiment of the present invention showing transmission of verified crop characteristic data to a network site.

In reference to FIG. 3, a crop harvesting machine 2 equipped with a remote crop characteristic sensor 12 operates in a field 30 harvesting a crop. Harvesting machine 2 may represent a plurality of machines working independently on different farms or locations as well as a group of machines working together.

Samples 32 of the type of crop being harvested have been provided to a calibration lab 20 and chemometric modeling or other methods have been used to generate sensor calibration data in lab 20. Sensor calibration data must be transmitted to remote sensors 12 so that they may make accurate crop characteristic measurements. This is preferably achieved by wireless data transmission from lab 20 to a communications device 17 on harvesting machine 2. When calibration data is received by communications device 17, computing device 16 may reconfigure sensors 12 with the new calibration data. After calibration, sensors 12 will accurately measure crop characteristics and may transmit crop characteristic information to other parties in real-time or otherwise.

While harvesting machine 2 carries out the harvesting process, sensors 12 may measure one or more characteristics of the crop being harvested. These measurements may be transmitted in real-time or may be recorded for future use. When real-time crop characteristic data is desired at other locations, crop characteristic data may be transmitted via computing device 16 and communications device 17 to numerous locations. However, crop characteristic data alone must be verified for accuracy by linking it with the calibration data used for its measurement. In this particular embodiment of the present invention, crop characteristic data is tagged with the current sensor calibration data in use at the time the measurements are made. Sensor calibration data may be extensive comprising complex algorithmic models and equations, therefore various coding or other techniques may be used to identify calibration data and models so that the entirety of the calibration information need not be transmitted to identify the calibration data. In one method, sensor models are identified by a code and the specific parameter settings required for calibration of the model are combined with the model code and transmitted with each crop characteristic data transmission. In this manner, crop characteristic data is stored or transmitted along with its calibration data so that the crop characteristic data can be verified. Constant repeated transmission of calibration identification data may slow data communications and monopolize precious bandwidth, therefore, methods maybe used to transmit calibration data at intervals or upon request. Calibration data or calibration identification codes may be transmitted with each crop characteristic data transmission, they may be transmitted at periodic time intervals or random intervals, they may be transmitted upon request from a centralized computing device 18 or some other party, or they may be transmitted by some other method.

Crop characteristic data coupled with sensor calibration identification data may be transmitted to any number of parties who take interest in crop characteristics and quality. In some embodiments of the present invention, for some conventional markets, crop characteristic data is transmitted to a broker or buyer 40. Broker/buyer 40 may then transact business regarding the sale of the crop using the crop characteristic data. With increasing use of crops in the chemical markets, certain crop characteristics are becoming extremely important to crop value. Crops may now be used for the production of plastics, polymers, monomers and other materials. A broker 40 or other party receiving this type of real-time crop characteristic data may arrange for the sale of the crop as it is being harvested and locate a buyer to whom the crop may be delivered thereby avoiding crop storage and handling costs. Broker 40 may verify the accuracy of the crop characteristic data by receiving independent sensor calibration data 42 which may comprise calibration codes or other calibration data identifiers which can be checked against the calibration data information received with the crop characteristic data to ensure that the proper calibration data was used in the measurement. With this verification process the broker may transact business for the harvester with assurance that the data received from the remote sensors 12 is accurate and reliable.

In an alternative embodiment of the present invention, calibration data is transmitted to a harvesting machine 2 from a calibration lab 20 and sensors 12 are configured with the calibration data as described above. Crop characteristic data is also combined with calibration data identifiers and transmitted to another party or parties as described above. However, in this embodiment the combined crop and calibration information is transmitted to a network server 50 via a wireless communication device 52. Network server 50 receives the data from the harvesting machine 2 and posts the information to a network site where it can be accessed by interested parties from computers 54 connected to the network. Network server 50 may post information to an information site, a marketing site, an auction site or other embodiments. In a preferred embodiment, network server 50 posts real-time crop characteristic data to a marketing or auction site where potential buyers may access the information and transact for the sale of the crop. Computers 54 may be used by chemical market buyers, commodity market buyers, crop end-users or other parties.

This alternative embodiment may also comprise a data verification method whereby crop characteristic data is verified. Network server 50 may also receive independent sensor calibration data 42 which independently identifies the correct calibration data that should have been used for crop characteristic measurement. If the independent calibration data 42 matches the calibration data transmitted with the crop characteristic data, the characteristic data is verified as accurate and posted to the site. If the independent calibration data does not match the calibration data identifier, the characteristic data is considered unreliable and is not posted or is posted as "without verification." The sender of the unreliable data may be notified so that the problem may be corrected. Using this verification process of the present invention participants can be assured that only accurate crop characteristic data is posted to a site.

Figure 5:
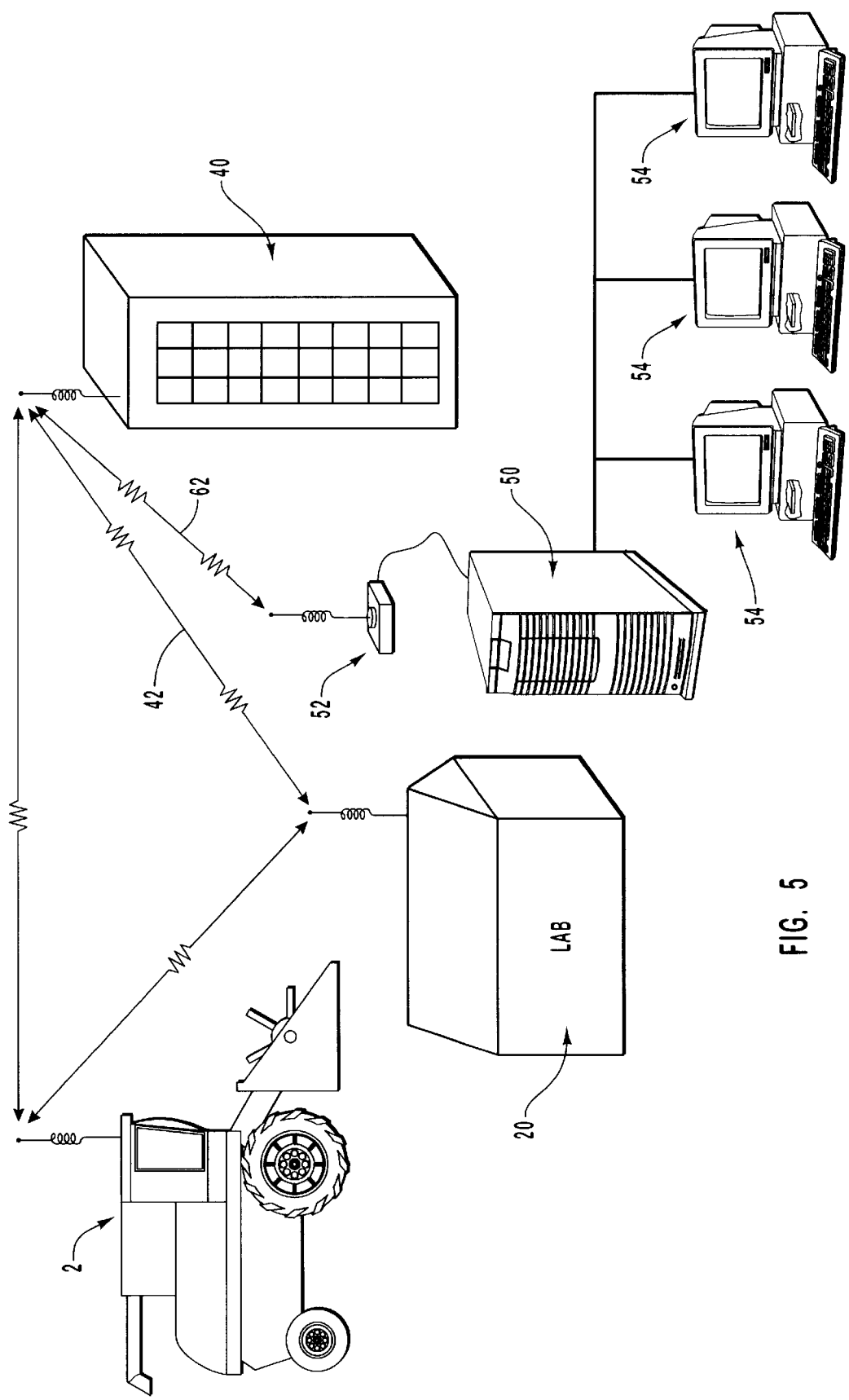
FIG. 5 is a diagram of elements of a preferred embodiment of the present invention showing transmission of verified crop characteristic data to an independent data verification service.

In yet another embodiment of the present invention crop characteristic data is verified by an independent verification service. As shown in FIG. 5, calibration data is transmitted to a harvesting machine 2 from a calibration lab 20 and sensors 12 are configured with the calibration data as described above. Crop characteristic data and calibration data identifiers are transmitted to another party or parties as described above. However, in this embodiment, crop characteristic data and sensor calibration data are sent directly to an independent verification service 60. This independent verification service 60 also receives independent calibration data 42. When the combined crop and calibration data are received from a harvesting machine 2 and the independent calibration data is received from lab 20, the crop characteristic data is verified and, if accurate, re-transmitted as verified information 62. In this manner, crop characteristic data may be independently verified to assure system participants of its accuracy.

Independent verification service 60 may transmit verified crop information 62 directly to third parties such as buyers. Independent verification service 60 may also provide verified information to a network or internet site for marketing, auction or information purposes. In a traditional marketplace, independent verification service 60 may also transmit to one or more brokers or to other parties desiring verified crop information.

In some embodiments of the present invention, calibration lab 20 may be combined with verification service 60 to form a calibration and data verification service which operates in the same manner as lab 20 and service 60, but without the need for external data transmission between lab 20 and service 60.

Calibration data may be linked to crop characteristic data using time data or location data. Some embodiments of the present invention may transmit crop characteristic data related to time or location data from communications device 17. Using these methods a data recipient such as broker 40, network server 50 or verification service 60 may verify that correct calibration data was used by comparing time-related crop characteristic data to time-related calibration data which is verified against independent calibration data. Similar verification methods can be performed with location-related data.

In other embodiments of the present invention, a harvesting machine 2 may also comprise a locating device 25, such as a GPS receiver, which may transmit location coordinates or other location information to computing device 16 and communications device 17 so that location data may be transmitted and related to configuration data or crop characteristic data. Using this location information, lab 20 or another party may correlate location data with calibration data and verify that proper calibration data is being used.

Some of these embodiments transmit location data from communications device 17 to lab 20 at regular intervals. Lab 20 will receive this location data and check it against a database or similar record to determine the type of crop present at that location. If the calibration data used for sensor 12 is the correct calibration for that location, the calibration data is ignored. If the calibration data is incorrect, sensor 12 will be automatically recalibrated for the crop present at that location.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for calibrating a crop characteristic sensor and verifying crop characteristic data comprising:

generating sensor calibration data for at least one crop variety;

transmitting said calibration data to one or more remote crop characteristic sensors;

calibrating said remote sensors with said calibration data;

measuring crop characteristic data with said calibrated sensors;

transmitting said crop characteristic data to a crop distributor;

transmitting an identifier of said calibration data used while measuring said crop characteristic data;

transmitting from said laboratory to said distributor an identifier of said crop calibration data transmitted to said remote sensors; and verifying that said sensor calibration data transmitted to said remote sensors from said laboratory is functionally identical to said sensor calibration data used while measuring said crop characteristic data.

2. The method according to claim 1, wherein said transmitting said calibration data to remote crop characteristic sensors is performed using wireless data transmission.

3. The method according to claim 1, wherein said calibration data may vary according to time.

4. The method according to claim 1, wherein said calibration data is transmitted from a site remote from said remote sensors.

5. The method according to claim 1, wherein said calibration data is generated from crop samples provided to a laboratory, said samples representing variations of at least one crop characteristic.

6. The method according to claim 1, wherein said remote sensors are tamper-proof such that their calibration parameters may only be manipulated by select parties.

7. The method according to claim 1, further comprising transmitting from said remote sensors crop characteristic data and calibration identification data which identifies said sensor calibration data.

8. The method according to claim 1, further comprising transmitting tagged data to a verification service wherein said verification service, also receives independent calibration data and verifies that the crop characteristic data comprised in said tagged data was measured using correct calibration parameters.

9. A system for transmitting verified crop characteristic data comprising:

means for providing crop samples to a laboratory, said samples representing variations of at least one crop characteristic;

means for generating sensor calibration data based on said samples;

means for transmitting said calibration data to remote crop characteristic sensors;

means for calibrating said remote sensors with said calibration data;

means for measuring crop characteristic data with said calibrated sensors;

means for transmitting said crop characteristic data to a crop distributor;

means for transmitting, along with said crop characteristic data, an identifier of said calibration data used while measuring said crop characteristic data;

means for transmitting from said laboratory to said distributor an identifier of said crop calibration data transmitted to said remote sensors; and means for verifying that said sensor calibration data transmitted to said remote sensors from said laboratory is functionally identical to said sensor calibration data used while measuring said crop characteristic data.

* * * * *